Aug. 25, 1936.   H. W. STONE   2,052,056
VEHICLE CONSTRUCTION
Filed Dec. 12, 1934   3 Sheets-Sheet 1
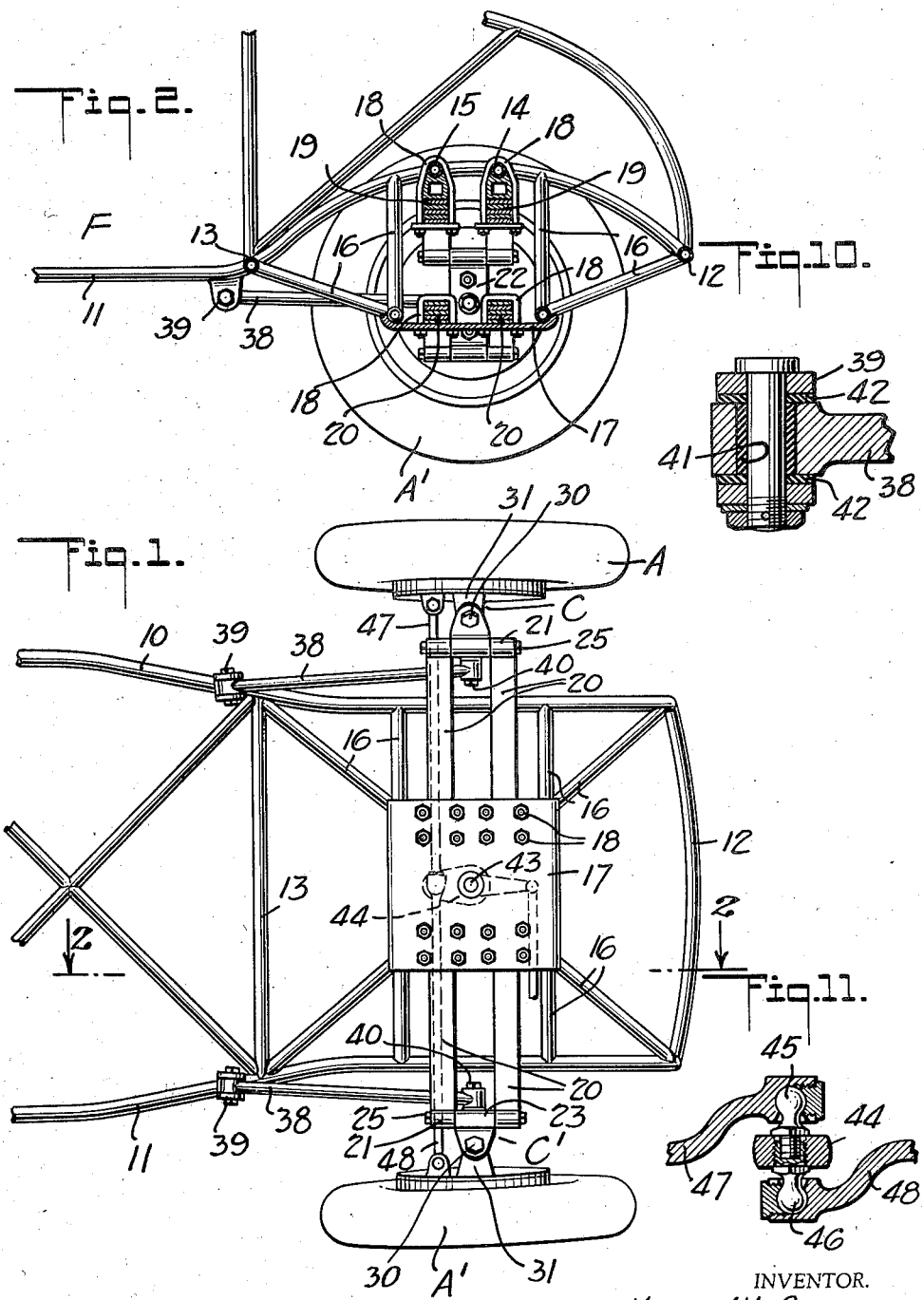
INVENTOR.
HARRY W. STONE
BY
Munn, Anderson & Liddy
ATTORNEYS.

Aug. 25, 1936.   H. W. STONE   2,052,056
VEHICLE CONSTRUCTION
Filed Dec. 12, 1934   3 Sheets-Sheet 2
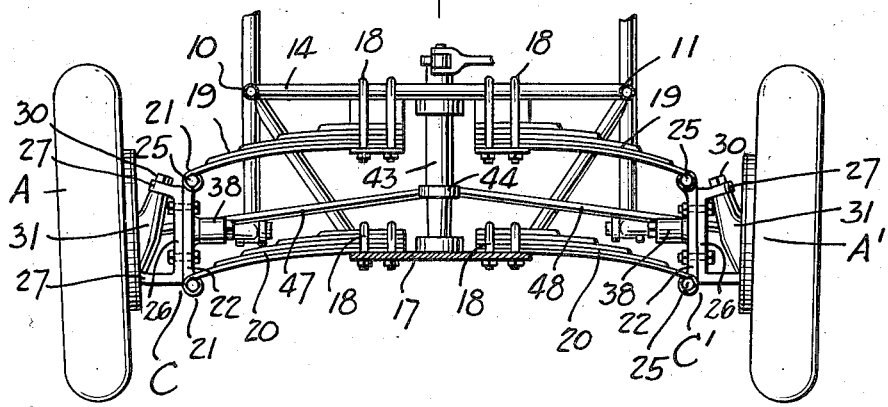

Aug. 25, 1936.    H. W. STONE    2,052,056
VEHICLE CONSTRUCTION
Filed Dec. 12, 1934    3 Sheets-Sheet 3
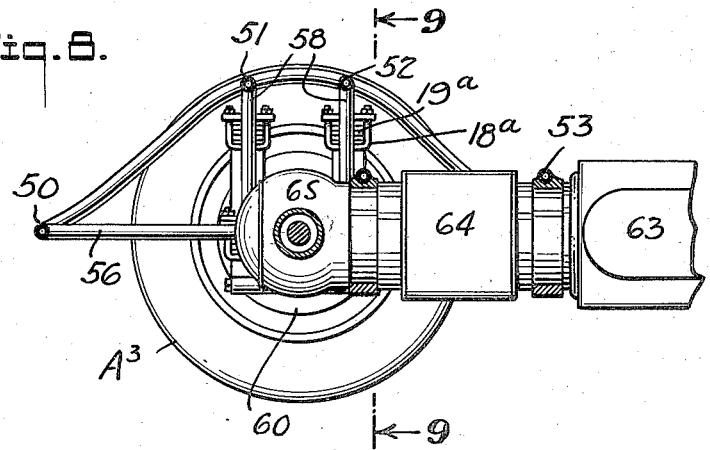
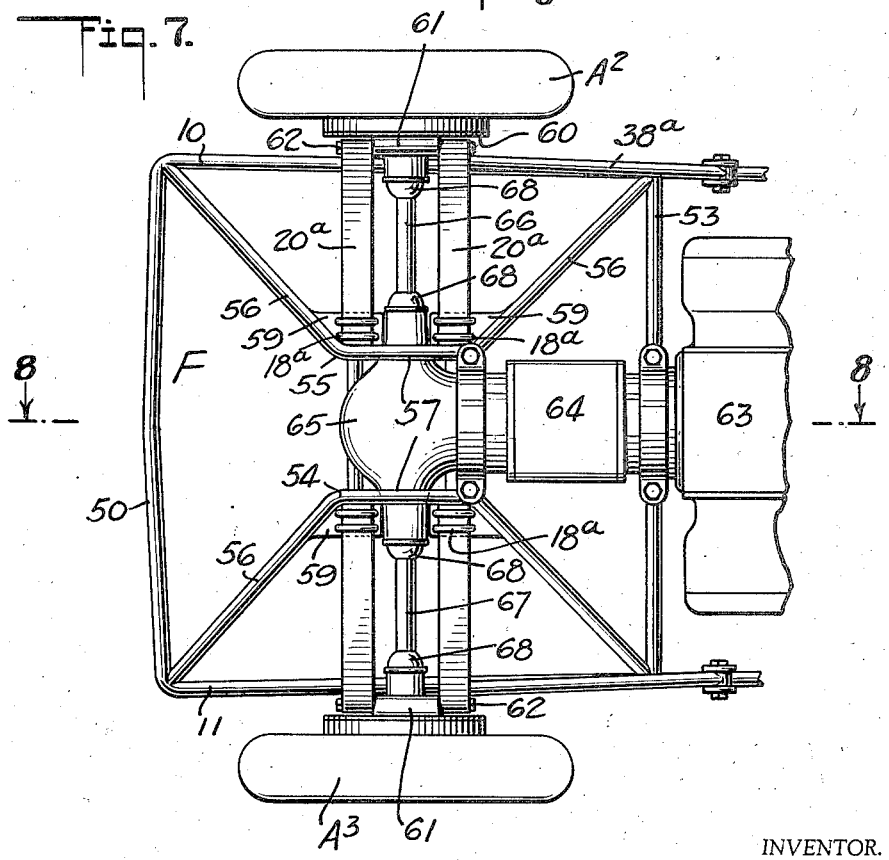
INVENTOR.
HARRY W. STONE
BY
Munn, Anderson & Liddy
ATTORNEYS.

Patented Aug. 25, 1936

2,052,056

UNITED STATES PATENT OFFICE 2,052,056

VEHICLE CONSTRUCTION

Harry W. Stone, Los Angeles, Calif.

Application December 12, 1934, Serial No. 757,224

4 Claims. (Cl. 280—96.1)

This invention relates generally to vehicle construction, and more particularly to wheel suspension and driving mechanisms therefor.

An object of this invention is to provide a suspension mechanism for the front and/or rear wheels of a vehicle by which the wheels are supported for vertical movement independently of each other by individual transverse springs, the number and arrangement of which insure maximum cushioning of road shocks while eliminating the necessity for expensive rigid front and rear axles.

Another object of this invention is to provide a mechanism of the above described character embodying a radius rod for each wheel associated therewith and with the frame of the vehicle in such manner that all driving and braking forces are transmitted from the wheel through the rod to the frame so as to insure free action of the individual transverse springs in effectively cushioning road shocks.

A further object of this invention is to provide in conjunction with the spring suspension mechanism, means by which the camber and/or caster of the front steering wheels of the vehicle can be varied in an extremely simple and expeditious manner in order to originally obtain the correct setting or position of adjustment for easy and safe steering, and to effect any readjustment which might be required incident to misalignment occurring during use of the vehicle.

Still another object of this invention is to associate with the spring suspension mechanism a simple and positive driving mechanism including power plant, transmission, clutch and differential gear units compactly associated with the rear wheel and spring assembly in a novel manner to reduce power losses to a minimum by efficiently transmitting a smooth flow of power to the rear wheels irrespective of the relative vertical movements of the wheels during travel on the road.

With these and other objects in view, the invention consists in the novel arrangements and combinations of elements as set forth in the following specification and particularly pointed out in the appended claims.

In the accompanying drawings,

Figure 1 is a bottom plan view of the forward portion of a vehicle chassis, showing the wheel suspension mechanism embodying this invention, associated with the front steering wheels of the vehicle;

Figure 2 is a vertical longitudinal sectional view taken on the line 2—2 of Figure 1;

Figure 3 is a view in front elevation partly broken away, of the chassis and spring suspension mechanism shown in the preceding figures;

Figures 4 and 5 are perspective views of a two-part connector embodied in the spring suspension mechanism;

Figure 6 is an enlarged detail sectional view illustrating the manner in which the parts of the two part connector are associated;

Figure 7 is a bottom plan view of the rear portion of the vehicle chassis looking in the direction of the arrows and assuming the chassis is turned right side up, showing the wheel suspension mechanism embodying this invention associated with the rear driven wheels of the vehicle;

Figure 8 is a vertical longitudinal sectional view taken on the line 8—8 of Figure 7;

Figure 9 is a vertical transverse sectional view taken on the line 9—9 of Figure 8;

Figure 10 is a detail sectional view of a form of pivotal connection embodied in the invention;

Figure 11 is a detail sectional view of a dual universal joint connection embodied in the invention.

Referring specifically to the drawings, and particularly to Figures 1 to 6, inclusive, and 10 and 11, this invention, in its present embodiment, comprises a chassis frame F of generally tubular construction including longitudinal members 10 and 11 suitably braced and rigidly connected at their forward ends by transverse members 12 and 13. The forward portions of the longitudinal members 10 and 11 are arched as shown in Figure 2, and these portions are also connected at substantially the top of the arches by other transverse members 14 and 15 which together with oblique braces 16 rigidly support a spring anchor platform 17 in a horizontal position centrally beneath and between the longitudinal members.

To the transverse members 14 and 15 and to the spring anchor platform 17 are rigidly secured by suitable U-bolts 18, the root ends of upper and lower sets of quarter elliptic leaf springs 19 and 20, respectively, there being two pairs of oppositely disposed springs in each set with the springs of each pair extending transversely of the chassis frame and in parallel spaced relationship. The several springs are identical in construction and dimensions, with the root ends of the upper set of springs disposed directly above the root ends of the lower set of springs.

The tip end of the master leaf of each spring is formed with an eye 21 and is adapted to be operatively connected to either a right or left road wheel assembly A or A', the wheels of which in the present instance are intended to function as the front steering wheels of the vehicle.

To this end, two parts connectors C and C' are provided, identical in construction, and one for each assembly A and A'. Each connector C or C' comprises a spring anchor member in the form of a rectangular plate 22 having upper and lower sleeves 23 and 24 with which the eyes 21 of the upper and lower springs 19 and 20 are respectively adapted to be alined so as to receive shackle bolts 25 and thereby pivotally anchor the tip ends of the upper and lower pairs of springs to the plate 22 at points one directly above the other.

The other part of each connector C or C' comprises a yoke member in the form of a U-bracket 26 having lateral branches 27 projecting from a rectangular plate 28. The branches 27 have aligned openings 29 through which a king pin 30 is adapted to be extended to pivotally mount the conventional steering knuckle 31 of the wheel assembly A or A' on the yoke member.

The plate 28 of the yoke member is provided centrally with an opening 32 and with arcuate slots 33 at opposite sides of and concentric with the center of such opening. A pin 34 carried by and projecting from opposite sides of the anchor member plate 22 has one of its ends mounted in the opening 32 to provide for a pivotal or tiltable adjustment of the yoke member on the anchor member in order to vary the caster of the king pin 30. Bolts 35 extend through the slots 33 and through registering openings 36 in the anchor member plate 22 and are provided with nuts 37. These nuts when tightened, rigidly clamp the yoke and anchor members together in a selected position of relative angular adjustment so as to maintain the king pin at the angle of caster selected.

Radius rods 38, one for each wheel assembly, are provided and each is pivotally connected at its rear end to a longitudinal member 10 or 11 of the chassis frame F as indicated at 39. The forward end of each rod is pivotally connected to the pin 34 of the corresponding anchor member, a nut 40 being threaded on the pin to secure the rod to the pin.

A detail of the specific connections at the ends of the radius rods is illustrated in Figure 10 and constitutes a sleeve 41 of elastic rubber interposed between the pivot pin of each connection and the rod. Elastic rubber washers 42 are also mounted on the pin of each connection to abut opposite sides of the rod. The sleeves 41 and washers 42 function to cushion shocks imposed on the radius rods and co-act with the latter in insuring that the free action of the springs will not be restricted, as it will be clear that all driving and braking forces will be transmitted to the chassis frame through the rods. This form of cushioned pivotal connection can as well be provided at the tip ends of the springs 19 and 20, as will be understood without further detailed description.

A vertical steering shaft 43 is journaled in the platform 17 and chassis frame centrally between the wheel assemblies A and A' and has fixed thereto a steering arm 44. By means of aligned ball and socket joints 45 and 46, one above and the other below the arm (Figure 11), the inner ends of links 47 and 48 are connected to the arm. The outer ends of these links are connected by a similar ball-and-socket joint to a suitable non-rotatable part of the respective wheel assembly, such as the steering knuckle 31 for example, so that rotational movement imparted by suitable mechanism (not shown) to the shaft 43, will effect corresponding steering movement of the wheels.

Referring now to Figures 7, 8 and 9, a spring suspension mechanism substantially the same in construction as that previously described, but for the rear driving wheels of the vehicle, is herein disclosed.

The longitudinal members 10 and 11 of the chassis frame F are connected at their rear end portions by transverse members 50, 51, 52 and 53 and by other members 54 and 55 having oblique end portions 56 and intermediate parallel spaced apart portions 57 extending longitudinally at opposite sides of the longitudinal center line of the frame.

A plurality of vertical struts 58 rigidly connect the members 51 and 52 with the intermediate portions 57 of the members 54 and 55. At the joinders of these members spring seats 59 are provided. To these seats upper and lower sets of quarter elliptic leaf springs 19a and 20a are anchored by U-bolts 18a. The number, arrangement and functioning of these springs is identical to that previously described in conjunction with the front wheels of the vehicle. However the tip ends of these rear springs are anchored to non-rotatable parts of the rear driving wheel assemblies A² and A³, which parts in the present instance constitute the brake band supports 60 having sleeves 61 through which shackle bolts 62 are passed.

Radius rods 38a are connected to the longitudinal members 10 and 11 and to the brake band supports 60 to function in the same manner as the radius rods 38 previously described.

Associated with the spring suspension mechanism for the rear wheels is a driving mechanism including a power plant 63, clutch and transmission 64 and differential gear unit 65, all forming a unitary structure mounted in the chassis frame. This specific arrangement and mounting of the driving mechanism is more specifically described and claimed in my co-pending application Serial No. 757,223, filed December 12, 1934.

Between the differential unit 65 and the rear wheels of the assemblies A² and A³ are right and left propeller shafts 66 and 67, having suitable universal joint connections 68 with the unit and wheels in order to permit vertical movements of the latter and yet transmit power thereto.

From the foregoing description, it will be manifest that there has been provided by this invention a simple, rugged and inexpensive spring suspension mechanism applicable to all wheels of the vehicle in a manner to resiliently mount the wheels for vertical movements independently of each other to efficiently cushion road shocks and to eliminate the usual expensive rigid axles. Furthermore, it will be manifest that the invention provides for necessary adjustments of the front steering wheels, in a manner to insure easy and safe steering while affording the advantages of structural simplicity and maximum structural strength.

What is claimed is:

1. In vehicle construction, a two part connector for operatively associating a road wheel assembly with a transverse spring suspension mechanism comprising a yoke member adapted for connection to the steering knuckle of the road wheel assembly; an anchor member adapted for connection to the tip ends of transverse springs; means for tiltably mounting the yoke member on the anchor member to provide for caster adjustments; and means for securing the members together in selected positions of adjustment.

2. In vehicle construction, a two part connector for operatively associating a road wheel assembly with a transverse spring suspension mechanism comprising a yoke member adapted for connection to the steering knuckle of the road wheel assembly; an anchor member adapted for connection to the tip ends of transverse springs; a pin carried by the anchor member and projecting into the yoke member for tilting adjustment of the latter on the anchor member to provide for caster adjustments; one of said members having arcuate slots concentric with the axis of said pin; and bolts extending through the slots and through the other member, for securing the members together in selected positions of adjustment.

3. In vehicle construction, a two part connector for operatively associating a road wheel assembly with a transverse spring suspension mechanism comprising a yoke member adapted for connection to the steering knuckle of the road wheel assembly, and having aligned openings for the passage of a king pin to provide a steering connection to the steering knuckle of the road wheel assembly; an anchor member having spaced sleeves for the reception of shackle bolts to anchor the tip ends of upper and lower transverse springs to the anchor member; a pin projecting from opposition sides of the anchor member intermediate the sleeves and extending at one end into the yoke member for tilting adjustment of the latter on the anchor member to provide for caster adjustments; the yoke member having arcuate slots concentric with the axis of said pin; and fastening members extending through the slots and through the other member, for securing the yoke and anchor members together in selected positions of adjustment.

4. A two-part connector of the character described comprising a yoke member including lateral branches and a connecting portion; said branches having aligned openings for the passage of a king pin and said connecting portion having an opening and arcuate slots at opposite sides of and concentric with said opening; an anchor member having spaced sleeves for the reception of shackle bolts; a pin carried by the anchor member and extending into said opening of the connecting portion of the yoke member to provide for angular adjustment between the members; bolts extending through the slots of the yoke member and through the anchor member; and nuts on the bolts which, when tightened, coact therewith in clamping the members rigidly together.

HARRY W. STONE.